(12) United States Patent
Gioanola et al.

(10) Patent No.: US 12,454,216 B2
(45) Date of Patent: Oct. 28, 2025

(54) AMBIENT LIGHTING SYSTEM WITH HAPTIC FEEDBACK FOR AUTOMOBILES

(71) Applicant: Magna Exteriors Inc., Aurora (CA)

(72) Inventors: Luca Gioanola, Aurora (CA); Federico Ramonda, Aurora (CA); Frank Hallitschke, Aurora (CA)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 18/015,777

(22) PCT Filed: Feb. 3, 2022

(86) PCT No.: PCT/CA2022/050154
§ 371 (c)(1),
(2) Date: Jan. 12, 2023

(87) PCT Pub. No.: WO2022/165595
PCT Pub. Date: Aug. 11, 2022

(65) Prior Publication Data
US 2023/0365058 A1    Nov. 16, 2023

(30) Foreign Application Priority Data
Feb. 4, 2021   (IT) .................. 102021000002447

(51) Int. Cl.
*B60Q 3/85*    (2017.01)
*B60K 35/21*   (2024.01)
*B60K 35/25*   (2024.01)
*B60K 35/80*   (2024.01)

(52) U.S. Cl.
CPC ............... *B60Q 3/85* (2017.02); *B60K 35/21* (2024.01); *B60K 35/25* (2024.01); *B60K 35/80* (2024.01)

(58) Field of Classification Search
CPC ............... B60Q 3/85; B60K 2360/141; B60K 2360/143; B60K 35/00; B60K 35/10
See application file for complete search history.

(56) References Cited

U.S. PATENT DOCUMENTS

| | | | |
|---|---|---|---|
| 2015/0219834 A1* | 8/2015 | Nichol | G02B 6/0076 445/24 |
| 2020/0214148 A1* | 7/2020 | Teil | H03K 17/962 |
| 2020/0294401 A1 | 9/2020 | Kerecsen | |
| 2020/0383580 A1 | 12/2020 | Shouldice et al. | |
| 2021/0153310 A1* | 5/2021 | Van Neer | H05B 45/305 |

* cited by examiner

Primary Examiner — Anne Marie Antonucci
Assistant Examiner — Jewel Ashley Kuntz
(74) Attorney, Agent, or Firm — Dickinson Wright PLLC

(57) ABSTRACT

An ambient lighting system for automobiles serves to illuminate at least a portion of a passenger compartment and includes a plurality of light guide modules, interposed between the light sources and said contact surface, adapted to guide light rays emitted by light sources and being designed to isolate the light rays to realize sector, blocks or regions adapted to be illuminated with very sharp contrast with the rest of the ambient lighting system. The ambient lighting system also includes at least one integrated touch sensor that is adapted to detect touch of said contact surface by an user's body portion in at least one defined region, and an actuator system for generating haptic feedback for the user.

13 Claims, 3 Drawing Sheets

AMBIENT LIGHTING SYSTEM WITH HAPTIC FEEDBACK FOR AUTOMOBILES

CROSS REFERENCE TO RELATED APPLICATION

This application is a U.S. National Stage of PCT International Application No. PCT/CA2022/050154, filed on Feb. 3, 2022, which claims priority to Italian Patent Application No. 102021000002447 filed on Feb. 4, 2021, the contents of which are each incorporated herein by reference.

FIELD OF THE INVENTION

This disclosure relates generally to ambient lighting systems for automobiles, and more particularly to ambient lighting systems for automobiles that are adapted to realize a human-machine interface with haptic feedback.

BACKGROUND OF THE INVENTION

Ambient lighting systems, comprising a plurality of RGB LED sources, placed along a band supporting structure, and covered by a diffuser module in order to diffuse homogeneously the light rays emitted by the RGB LED sources, are known.

In general, ambient lighting systems are adapted to provide only lighting and/or visual feedback to a user. Ambient lighting systems may be programmed in order to display animation lighting effects. Such lighting effects can be used in order to give visual feedback to the driver in order to help the same driver during the driving of the automobile.

Also known are ambient lighting systems adapted to receive inputs from the users. Such ambient lighting systems may include touch sensors, integrated in the ambient lighting system, which are able to determine when the user is tapping on the ambient lighting system.

Also known are screens and displays for interface systems, which are able to provide haptic feedback when a user touches a surface of such screens or displays.

Such screens and displays may also be applied within an automobile as a visual interface with the automobile's passengers. Such screens and displays may have large dimensions and may be explicitly designed in order to work as a human-machine interface, such that they are not designed or intended to provide ambient lighting for the automobile.

SUMMARY OF THE INVENTION

The size, shape and structure of screens and displays in automobiles may easily permit the embedding of actuators that can generate haptic feedback for users. However, it may be desirable to use an ambient lighting system within an automobile as an active human-machine interface, which would be able to receive different and various inputs from the user and provide different kinds of feedback, such as different kinds of feedback as a function of the input received.

Due to the shape and dimension of known ambient lighting systems there is a strong technical bias against such ambient lighting systems providing further kinds of feedback to a user. As one result, ambient lighting systems able to provide haptic feedback and, consequently, ambient lighting systems able to provide different haptic feedback as a function of different received inputs, do not appear to be known.

The present application is directed to addressing the above-mentioned technical problems, as well as addressing other issues, such as cost reduction and/or optimization.

In accordance with an aspect of the disclosure, there is provided an ambient lighting system for automobiles adapted to illuminate at least a portion of a passenger compartment; said ambient lighting system being adapted to emit light in colors and intensities as desired or run a light animation, and having a longitudinal extension that is greater, at least of an order of magnitude, than the width and thickness of said ambient lighting system, and such width and thickness have comparable dimensions; said ambient lighting system comprising:—at least one optical system, the at least one optical system comprising: a plurality of light sources adapted to emit light rays; a structural support on which said plurality of light sources are placed; at least one contact surface on which a user can act, and through which light rays emitted by said plurality of light sources can exit; a plurality of light guide modules, interposed between the light sources and said contact surface, adapted to guide the light rays emitted by said light sources and being designed to isolate the light rays emitted by each light module in order to realize sector, blocks or regions adapted to be illuminated with very sharp contrast with the rest of the ambient lighting system; said ambient lighting system further comprising: a control unit adapted to control said plurality of light sources of said optical system; at least one capacitive touch sensor, locally integrated in the ambient lighting system, adapted to detect touch of said contact surface by an user's body portion in at least one defined region (B); said at least one capacitive touch sensor being electronically connected to said control unit; said ambient lighting system being characterized in that an actuator system, able to generate a haptic feedback to user at least when the user is touching said contact surface in said defined region (B), is comprised; said actuator system is adapted to produce a vibration perceptible by the user's body portion when said user's body portion is touching said contact surface in said defined region (B); said actuator system is electronically connected to said control unit, which is adapted to control said actuator system.

In embodiments, the ambient lighting system comprises a plurality of capacitive touch sensors, placed along a direction inside said region (B), said plurality of capacitive touch sensors are electronically connected to said control unit; said control unit is adapted to detect a sliding of said user's body portion on said contact surface along at least one direction.

In embodiments, said control unit is adapted to detect a way, along said direction, along which said user's body portion is sliding on said contact surface.

In embodiments, said control unit is adapted to vary color and/or intensity of light rays emitted by said plurality of light sources as a function of the sliding of said user's body portion on said contact surface detected.

In embodiments, said control unit is adapted to vary intensity and/or frequency of the vibration produced by said actuator system as a function of the sliding of said user's body portion on said contact surface detected.

In embodiments, said control unit is adapted to vary intensity and/or frequency of the vibration produced by said actuator system in function of the variation color and/or intensity of light rays emitted by said plurality of light sources simultaneously with the sliding of said user's body portion on said contact surface.

In embodiments, said contact surface is mechanically constrained at least at two points along its longitudinal extension; said actuator system comprises at least one actuator; among two mechanical constraints, inside said defined region (B), said at least one actuator is placed; said at least one actuator being adapted to produce a vibration perceptible by the user's body portion.

In embodiments, said contact surface, due to its vibration, generates at least a sound audible at least by the user who is touching said contact surface.

In embodiments, said capacitive touch sensor is placed below said contact surface, being placed at least upon a face of said structural support.

In embodiments, said actuator system and said capacitive touch sensors are activated by the control unit when the same control unit is receiving a command of activation of a specific function concerning said ambient lighting system.

In embodiments, the light sources are RGB LEDs.

In accordance with another aspect, there is provided an automobile comprising a passenger compartment including inner equipment; said passenger compartment comprising at least one area adapted to be lit by means of the ambient lighting system.

The features and the advantages of the system, and the automobile, will become clear and evident from the following description in which a plurality of embodiments is disclosed.

BRIEF DESCRIPTION OF THE DRAWINGS

Embodiments will now be described with reference to the appended drawings in which.

DETAILED DESCRIPTION

Figure 1A:
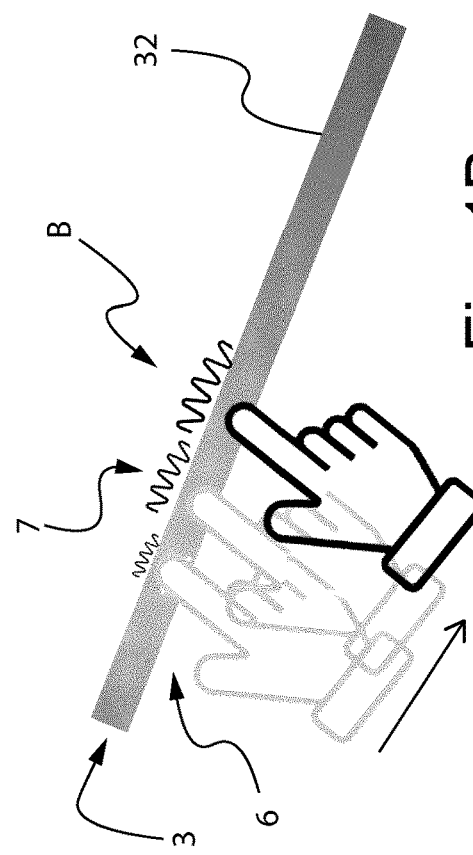
FIGS. 1A and 1B show a portion of an ambient lighting system that, according to an aspect of this disclosure, is able to generate haptic feedback for a user.
Figure 1B:
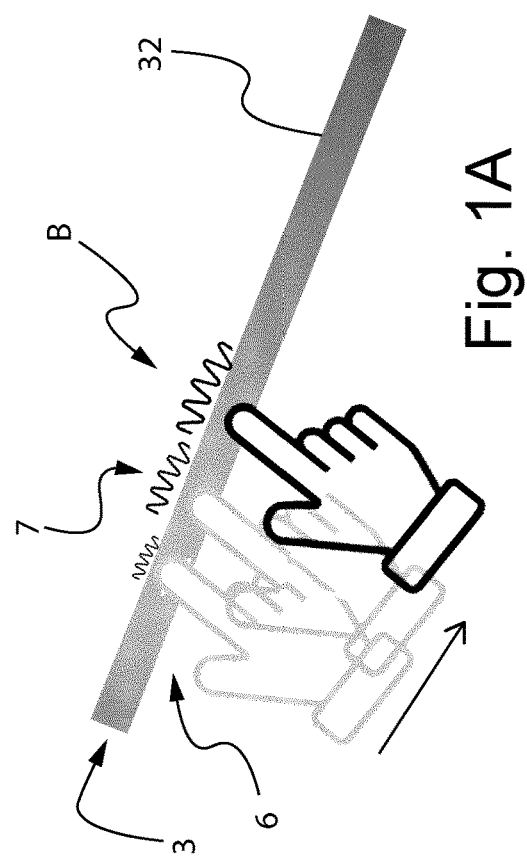

FIGS. 1A and 1B show a portion of an ambient lighting system that, according to an aspect of this disclosure, is able to generate haptic feedback for a user. More particularly, FIG. 1A shows the ambient lighting system able to produce vibrations perceptible by the user's body portion when the user's body portion is sliding on a contact surface in order to vary the color of the light rays emitted by the light sources. FIG. 1B shows the ambient lighting system able to produce vibrations perceptible by the user's body portion when the user's body portion is sliding on a contact surface in order to vary the intensity of the light rays emitted by the light sources.

Figure 2A:
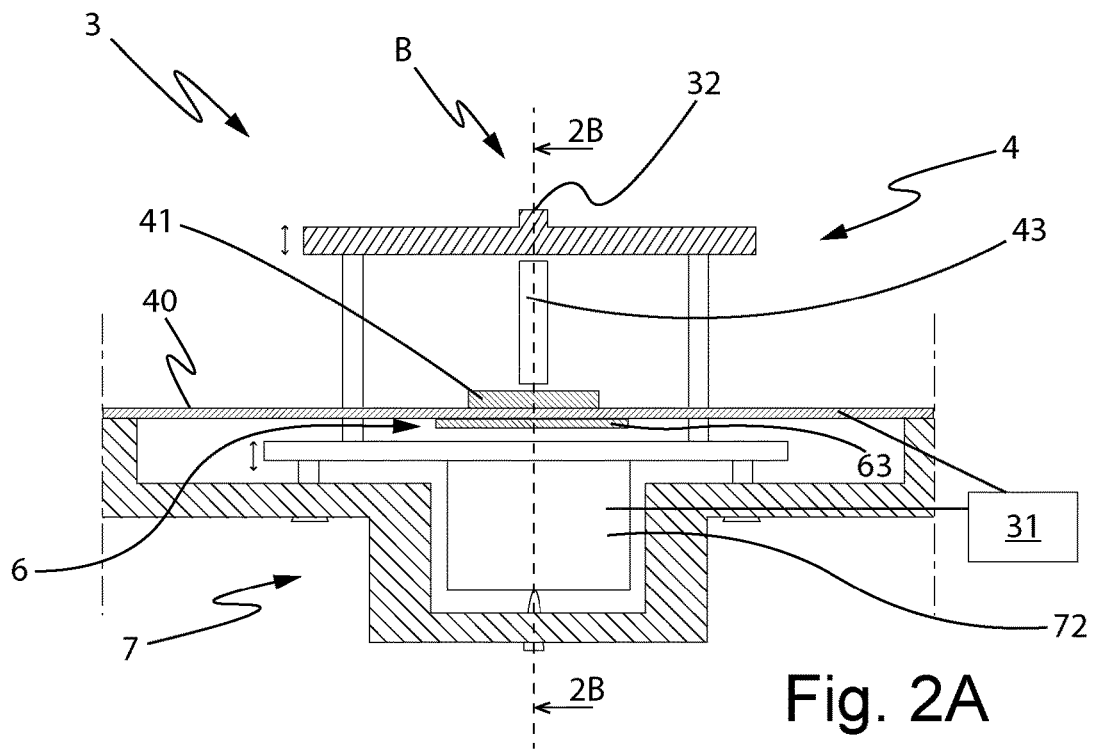
FIGS. 2A and 2B show, in a schematic view, an embodiment of an ambient lighting system comprising an actuator system adapted to produce at least a vibration perceptible by the user's body portion when the user's body portion is touching the contact surface in a defined region.
Figure 2B:
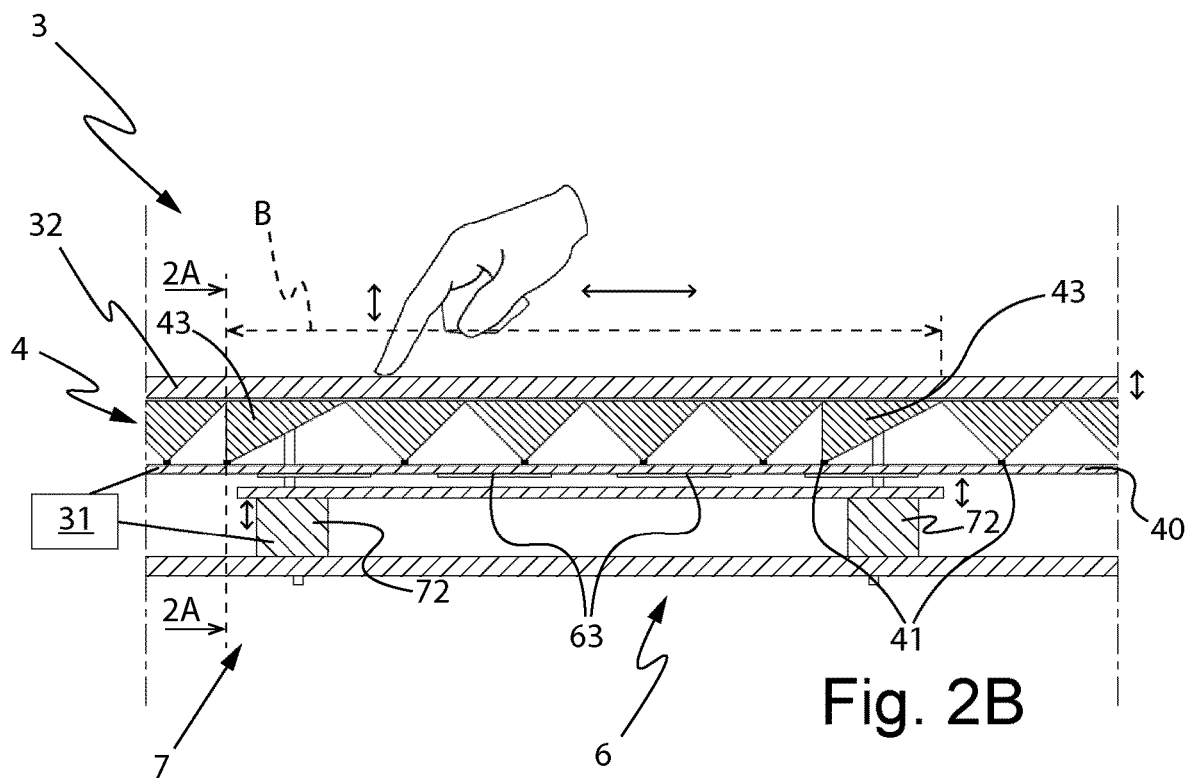

FIGS. 2A and 2B show, in a schematic view, an embodiment of an ambient lighting system comprising an actuator system adapted to produce at least a vibration perceptible by the user's body portion when the user's body portion is touching the contact surface in a defined region. In particular, FIG. 2A shows a cross section of the ambient lighting system according to the embodiment; and FIG. 2B shows a longitudinal section of the ambient lighting system of FIG. 2A.

With reference to the drawings, reference numeral 3 designates as a whole the ambient lighting system, according to an aspect of this disclosure. Furthermore, reference numeral 2 designates as a whole an automobile comprising a passenger compartment 22 in which the ambient lighting system 3, according to an aspect of this disclosure, is applied.

The ambient lighting system 3, according to an aspect of this disclosure, is adapted to be applied on automobiles 2, the latter having passenger compartment 22.

The ambient lighting system 3 is adapted to illuminate at least a portion of the passenger compartment 22.

More in general, the ambient lighting system 3 is adapted to emit light in the colors and/or intensities as desired, and/or run a light animation, showing animation lighting effects. Ambient lighting system 3 has a longitudinal extension that is greater, at least of an order of magnitude, than the width and thickness of the ambient lighting system 3, and such width and thickness have comparable dimensions.

According to an aspect of this disclosure, the ambient lighting system comprises at least one optical system 4.

In an embodiment, ambient lighting system 3, and in particular optical system 4, has a tape structure adapted to obtain the desired shape, for instance following shapes of one or more portions of the passenger compartment 22 of the automobile 2, for example a console.

The optical system 4 in turn comprises: a plurality of light sources 41, which may for example be RGB LEDs, adapted to emit light rays; and a structural support 40, on which the plurality of light sources 41 are placed.

The optical system 4, furthermore, comprises at least one contact surface 32, on which a user can act. Through the at least one contact surface 32 the light rays emitted by the plurality of light sources 41 can exit.

The ambient lighting system 3 comprises also a control unit 31. The control unit 31 is adapted to control the plurality of light sources 41 comprised in the optical system 4.

The ambient lighting system 3, in embodiments the optical system 4, comprises at least one capacitive touch sensor 6. The at least one capacitive touch sensor 6 may, in embodiments, be locally integrated in the ambient lighting system 3. In an embodiment, the at least one capacitive touch sensor 6 is locally integrated inside the ambient lighting system 3. In an embodiment, the at least one capacitive touch sensor 6 is locally integrated inside the optical system 4.

For the purpose of the present description, the term "integrated" means united and/or combined, thus a part of the device, which cannot be removed without disassembling or damage the ambient lighting system 3 as such.

The at least one capacitive touch sensor 6 is adapted to detect the touch of the contact surface 32 by a user's body portion in at least one defined region "B". The at least one capacitive touch sensor 6 is electronically connected to the control unit 31.

The ambient lighting system 3, according to an aspect of this disclosure, comprises at least one actuator system 7. The at least one actuator system 7, which may be a single actuator system 7, is able to generate a haptic feedback to the user at least when the user is touching the contact surface 32 in the defined region "B".

The actuator system 7 is adapted to produce a vibration perceptible by the user's body portion when the user's body portion is touching the contact surface 32 in the defined region "B".

The actuator system 7 is electronically connected to the control unit 31. The control unit 31 is adapted to control the actuator system 7.

The ambient lighting system 3, according to an aspect, allows the user to receive a feedback from the same ambient lighting system 3 when at least the contact surface 32 has been touched by the user's body portion. Such feedback is a haptic feedback that is felt by the user through the user's body portion that is touching the contact surface 32.

The ambient lighting system 3, by being able to provide non-visually sensed feedback such as haptic feedback in addition to or as an alternative to visually-sensed feedback, can serve as a more sophisticated human-machine interface. For example, the solution allows merging of at least two different kind of feedbacks in the same ambient lighting system 3, which is able to provide at least two different kinds of feedback to users. In fact, in embodiments the same contact surface 32 can provide a visual feedback using the emission of light rays, as well as haptic feedback using the vibration generated by the actuator system 7.

In one embodiment, the contact surface 32, due to its vibration, generates at least a sound audible at least by the user who is touching the contact surface 32. This solution allows merging three different kinds of feedback in the same ambient lighting system 3. For example, the same contact surface 32 can provide visual feedback using the emission of light rays, haptic feedback using the vibration generated by the actuator system 7, and sound feedback thanks also to the vibration generated by the actuator system 7.

In an embodiment, the actuator system 7 comprises at least one actuator 72. In embodiments, each of the at least one actuator 72 can be a piezoelectric actuator, a rotating mass actuator, an electromagnetic actuator or an actuator that comprises at least one resonator.

In an embodiment, an actuator 72 is able to deliver a linear force on a contact surface 32. In an embodiment, the linear force delivered to such contact surface may be up to 20N (Newtons).

The contact surface 32 is at least one surface that vibrates, for instance tilts, distorts and/or resonates, due to the vibration produced by the actuator system 7, for instance by the actuator 72.

In an embodiment, the contact surface 32 is mechanically constrained at least at two points along its longitudinal extension, for example at its ends, such as at the ends of the region "B". These mechanical constraints avoid that the same contact surface 32 can vibrate due to other external vibration sources, for instance avoiding that such contact surface 32 vibrates due to external influences such as those from the automobile while it is running.

Between two mechanical constraints of the contact surface 32 and, in an embodiment, inside the region "B", at least one actuator 72 is placed. The at least one actuator 72 is adapted to produce a vibration perceptible by the user's body portion, such as when the user's body portion is touching the contact surface 32 between the mechanical constraints.

In embodiments, the contact surface 32 due to its vibration, which is generated by the actuator system 7, for instance by the at least one actuator 72, generates at least a sound audible at least by the user who is touching the contact surface 32.

In embodiments, the contact surface 32 vibrates at a frequency between 20 Hz and 20 kHz.

In embodiments, the contact surface 32, which vibrates, is at least a portion of the illuminated surface of the ambient lighting system 3. The contact surface 32 can be an optical filter, a diffusive module, a light guide module or other optical elements or a protection layer placed upon the other elements and/or modules of which the optical system 4 is comprised.

The contact surface 32 is designed to be touched by the user. The same contact surface 32 is designed to propagate the vibrational effect along its longitudinal extension.

In some embodiments, the contact surface 32 has extension greater than the extension of the rest of the optical system 4, thus also overlapping a non-optical portion of the ambient lighting system 3.

In some embodiments, the optical system 4 further comprises at least one diffusive module 42. The at least one diffusive module 42 is adapted to diffuse homogeneously the light rays emitted by the plurality of light sources 41. The diffusive module 42 can be placed below the contact surface 32 or can be part of the contact surface 32.

In some embodiments, the optical system 4 further comprises a plurality of light guide modules 43. The light guide modules 43 may be interposed between the light sources 41 and the at least one diffusive module 42 or the contact surface 32. The light guide modules 43 are adapted to guide the light rays emitted by the light sources 41, in particular towards the diffusive module 42 or the contact surface 32.

In some embodiments, each of the light guide modules 43 may be designed to isolate the light rays emitted by each light guide module 43 in order to realize sectors, blocks or regions adapted to be illuminated with very sharp contrast with the rest of the ambient lighting system 3. This embodiment could be used for better defining the region "B" of the contact surface 32 where the at least one capacitive touch sensor 6 is able to detect the touch of the contact surface 32 by a user.

In some embodiments, the contact surface 32 may be placed above the light guide modules 43. The contact surface 32 may be a transparent film or layer that allows achieving anti-reflective and/or anti-smudging purposes. The contact surface 32 may be made of plastic or glass, or any other suitable material able to propagate the vibrations and, in embodiments implicating sound feedback, to emit sounds during its vibrations. In such embodiments, each of the guide modules 43 may be interposed between the light sources 41 and the diffusive contact surface.

In some embodiments, between the contact surface 32 and the guide modules 43 a gap, such as an air gap, so that such contact surface 32 does not touch any of the guide modules 43 during its vibrations.

In the ambient lighting system 3, according to embodiments, the at least one capacitive touch sensor 6 can be also used for realizing at least one soft button. For the purpose of the present description, the term "soft button" has to be intended as a simulated button or key that is displayed on a surface adapted to be touched. Such a soft button may alternatively be called a "virtual button" or a "virtual key". Using a soft button, electronic circuits, which could be remote, can be controlled, activating or deactivating one or more functionalities. In embodiments, the at least one capacitive touch sensor 6 allows the ambient lighting system 3 to become an active human-machine interface, which is able to receive inputs by the users.

More generally, the capacitive touch sensor 6 is a transducer able to detect when a surface, more in particular the contact surface 32, has been touched by a user, such as by one or more user's fingers, due to the capacitive effect. The contact surface 32 may be a part of the capacitive touch sensor 6.

In an embodiment, a plurality of capacitive touch sensors 6, placed along a direction inside the region "B", are included. In this embodiment, more than one capacitive touch sensor 6 is used for detecting the touch of the contact surface 32 by a user in the defined region "B". The plurality of capacitive touch sensors 6 are electronically connected to the control unit 31. In embodiments, the control unit 31 is able to process the signals received by the plurality of capacitive touch sensors 6.

The control unit 31 is adapted to detect a sliding of the user's body portion on the contact surface 32 along at least one direction.

In some embodiments, the control unit 31 is adapted to detect a direction along which the user's body portion is sliding on the contact surface 32. For example, the control unit 31 may be adapted to detect if the user's body portion is sliding from the right to the left (i.e. leftward) on the contact surface 32 or the contrary from the left to the right (i.e. rightward). Detection of other and/or additional directions may be provided.

In an embodiment, the control unit 31 is adapted to vary color and/or intensity of the light rays emitted by the plurality of light sources 41 as a function of the detected sliding of the user's body portion on the contact surface 32.

In an embodiment, the control unit 31 is adapted to vary the intensity and/or frequency of the vibration produced by the actuator system 7 as a function of the detected sliding of the user's body portion on the contact surface 32. This embodiment allows the user to achieve haptic feedback that changes, as a function of the length of the sliding along the contact surface 32, and/or the starting point of the sliding and/or the ending point of the sliding.

In an embodiment, the control unit 31 is adapted to vary the intensity and/or frequency of the vibration produced by the actuator system 7 as a function of the variation of color of the light rays emitted by the plurality of light sources 41, simultaneously with the sliding of the user's body portion on the contact surface 32.

In an embodiment, the control unit 31 is adapted to vary the intensity and/or the frequency of the vibration produced by the actuator system 7 as a function of the variation of intensity of the light rays emitted by the plurality of light sources 41, simultaneously with the sliding of the user's body portion on the contact surface 32.

In an embodiment, the control unit 31 is adapted to vary the intensity and/or the frequency of the vibration produced by the actuator system 7 as a function of the variation color and intensity of the light rays emitted by the plurality of light sources 41, simultaneously with the sliding of the user's body portion on the contact surface 32.

These embodiments allow the user to achieve a haptic feedback as a function of the user's decisions on color and/or intensity of the light rays emitted by the plurality of light sources 41. The intensity and/or frequency of the vibrations produced by the actuator system 7 may depend on the length of the sliding along the contact surface 32, and/or the starting point of the sliding and/or the ending point of the sliding. For example, the vibration may increase or decrease in its frequency and/or its intensity, in a progressive way or with steps recognizable by the user.

In a further embodiment, the control unit 31 is adapted to vary the intensity and/or the frequency of the vibration produced by the actuator system 7 as a function of a variation desired by the user on another functionality comprised in the automobile, simultaneously with the sliding of the user's body portion on the contact surface 32.

In the ambient lighting system 3, according to an aspect of the disclosure, for instance thanks to the optical system 4, a part of the ambient lighting system 3, and in particular the region "B" can be illuminated differently with respect to the rest of the ambient lighting system 3. For example, the region "B" can be illuminated as a sequence of colors from the colder to the warmer, or a specific color with different intensity, from the lower to the higher.

The embodiments described allow the region "B" of the ambient lighting system 3 to serve as a complex human-machine interface. In fact, the user can enter the user's preferences and the same user receives various kind of feedback, and in particular at least a haptic feedback. In an embodiment, the user also or alternatively can receive acoustic feedback.

In embodiments, region "B" can be seen immediately, and without doubts, by the users, who know intuitively where they have to touch on the ambient lighting system 3 in order to give inputs, which allow regulating the ambient lighting system 3, for instance color and/or intensity of the light rays emitted by the ambient lighting system 3, or controlling another functionality comprised in the automobile.

Thus, the ambient lighting system 3, according to the present disclosure, is turned into a functional part and it can interact actively with the users.

In an embodiment, the contact surface 32 is mechanically constrained at least at the two ends of the region "B" along contact surface's longitudinal extension. Between such two mechanical constraints of the contact surface 32, inside region "B", at least one, but perhaps two or more, actuator 72 is placed. The actuator 72 is adapted to produce a vibration on the contact surface 32 perceptible by the user's body portion during the sliding on the same contact surface 32. The same contact surface 32, due to its vibration, generates at least a sound audible at least by the user who is touching the contact surface 32.

In an embodiment, the actuator system 7 comprises a plurality of actuators 72 that realize an array or a matrix, in which the control unit 31 is able to activate each actuator 72 independently, in order to give different haptic effects in function of the function or functionality that is activated and used by the user.

The actuator system 7 is activated by the control unit 31 when the same control unit 31 receives a command of activation of a specific function concerning the ambient lighting system 3, for instance the functions as follows: change color; change intensity; change animation etc. which are referred to the same ambient lighting system 3, or be associated to other functionalities comprised in the automobile, for instance change the interior temperature, control air conditioning system, control free-hand systems etc. The functions can be activated trough a specific respective command. The commands can be inputted through a switch, soft or hard switch, or through a voice command recognition system. Such switches or systems are properly connected to the control unit 31 of the ambient lighting system 3. Such switches or voice recognition systems per se are not described in particular detail in this disclosure, as they are well known to the skilled reader.

More in general, the capacitive touch sensor 6 is placed below the contact surface 32.

In an embodiment, the capacitive touch sensor 6 comprises at least one conductive layer 63, which is placed below the contact surface 32.

In an embodiment, the capacitive touch sensor 6 and/or the conductive layer 63, is placed at least upon a face of the structural support 40. For example, the capacitive touch sensor 6 can be placed upon the structural support 40, for instance between the light sources 41 along the extension of the ambient lighting system 3. Alternatively, the capacitive touch sensor 6 can be placed on a face of the structural support 40 that is opposite to the face where the light sources 41 are placed. In a different embodiment, the capacitive touch sensor 6 is integrated inside the structural support 40, so that they are realized in a single body.

In embodiments of the ambient lighting system 3 in which the optical system 4 comprises a light guide module 43, the conductive layer 63 could be placed above at least one light guide module 43. In such embodiments, the at least one conductive layer 63 may be made of conductive transparent material.

Embodiments of an ambient lighting system comprising capacitive touch sensors are disclosed in more detail in the patent application WO2020202002A1, the whole content of which has to be considered as incorporated by reference in the content of the present patent application.

In embodiments, the at least one conductive layer 63 is interposed between the at least one light guide module 43 and the at least one diffusive module 42, for example placed on the light guide module 43. Alternatively, the conductive layer 63 is fixed to a face of the diffusive module 42, which is faced to the light guide module 43 or faced to the contact surface 32.

In another embodiment, the at least one conductive layer 63 is placed above the at least one diffusive module 42, or fixed to a face of the contact surface 32 that is opposite to the face on which the user can touch the contact surface 32.

In all the above-mentioned embodiments, the conductive layer 63 may be made of conductive transparent material.

In another possible embodiment, illustrative and not limitative, of the ambient lighting system 3, according to the present disclosure, the capacitive touch sensor 6 is placed below the at least one light guide module 43.

More in general, the capacitive touch sensor 6 is designed in function of its position respect to the contact surface 32. Potentially, the entire ambient lighting system 3, and in particular the optical system 4, is properly designed, according to the capacitive touch sensor 6 that has been chosen. In view of the above, it is clear that the position of the capacitive touch sensor 6, and its elements, can be chosen according to the needs, maintaining all its operational functionalities.

In an embodiment, inside the optical system 4 of the ambient lighting system 3 just one portion of the whole capacitive touch sensor 6 could be present. For example, a conductive layer 63, which acts as a sensing electrode of a capacitor, can be locally placed in the optical system 4, and, instead, electronic components, which are adapted to evaluate whether the user touches the contact surface 32 or not, can be placed in a remote position, for example being comprised in the same control unit 31 of the ambient lighting system 3.

More in general, the control unit 31 is able to detect changes in capacitance respect to one or more electrodes of one or more capacitive touch sensors 6.

In another possible embodiment, the capacitive touch sensor 6 can comprise a touch panel in which mutual coupling between row and column electrodes is measured.

Generally speaking, the capacitive touch sensors 6 have to be designed in order to be able to detect touches on a surface that is defined, from shapes and dimensions point of view, by the region "B", which is illuminated by the optical system 4, according to the present disclosure. On the other hand, the capacitive touch sensors 6 are advantageously designed so that in case of touches made outside the borders of the region "B" no change in capacitance is detected.

In the embodiment of the ambient lighting system 3, in which the optical system 4 comprises a plurality of light guide modules 43, each light guide module 43 is adapted to be associated to a single light source 41. Alternatively, each of the plurality of light guide modules 43 is adapted to be associated with two or more light sources 41.

In embodiments, the contact surface 32 can be realized in a single piece that extends along the length of the ambient lighting system 3. In alternative embodiments, the contact surface 32 can be realized in two or more portions, properly joined together, in order to appear as a single piece; thus, the junctions are not visible by the users. The contact surface 32 can be made of Plexiglas™, for instance OV200, or other suitable materials. In the same way, a diffusive module 42 can be realized in a single piece that extends along the length of the ambient lighting system 3, or it can be realized in two or more portions, properly joined together.

The structural support 40 can be realized in a single piece, which extends along the length of the ambient lighting system 3. In an alternative embodiment, the structural support 40 can be realized in two or more portions.

The structural support 40 can be a PCB, thus having well known structural features. In a possible embodiment, the structural support 40 is made of composite material, composed of woven fiberglass cloth with an epoxy resin, for instance FR-4 material. In an alternative embodiment, the structural support 40 is made of elastic material, allowing it to be bent, in order to follow a specific non-rectilinear path along the passenger compartment 22, for instance a console.

In embodiments, the ambient lighting system 3 is designed so that the structural support 40 is not subjected to the vibrations generated by the actuator system 7, such as in embodiments where light guide modules are present and placed between the structural support 40 and the contact surface 32.

In embodiments, the ambient lighting system 3 is designed so that the structural support 40 vibrates as a whole with the contact surface 32, such as in the embodiments where light guide modules between the structural support 40 and the contact surface 32 are missing.

The plurality of light sources 41 may be LEDs of the RGB kind. The RGB light sources 41 may be of a front emission kind.

Figure 3:
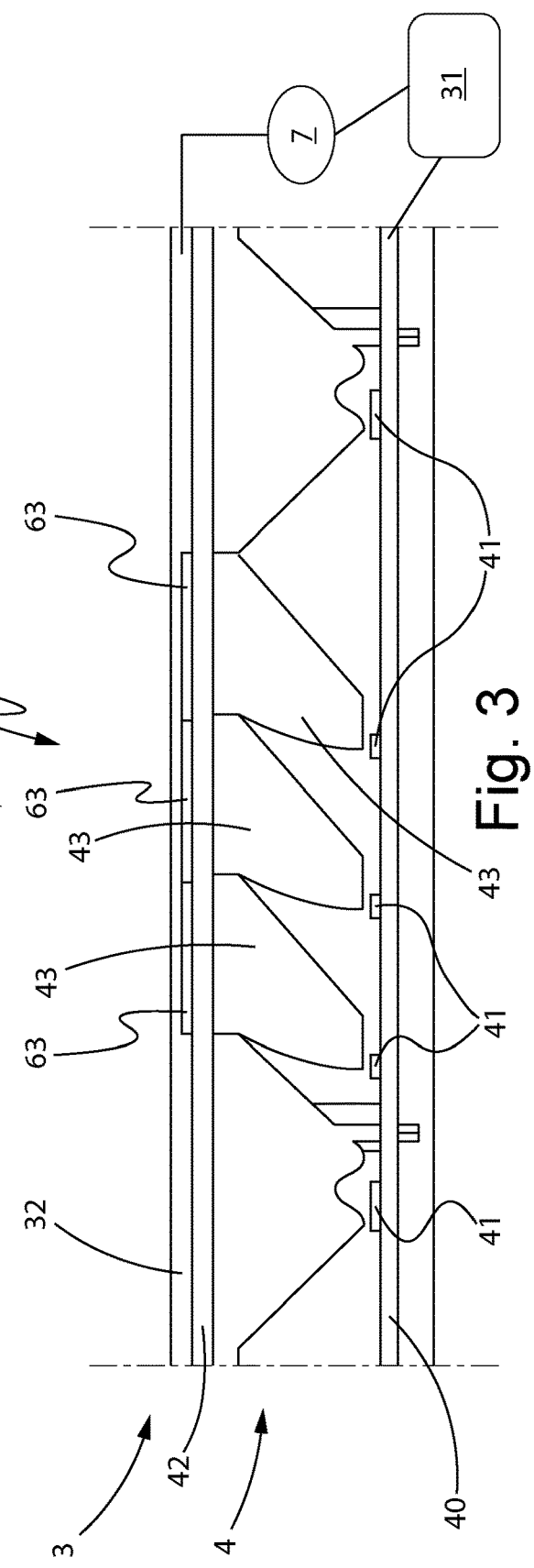
FIG. 3 shows another embodiment of an ambient lighting system in a longitudinal section.

In embodiments in which light guide modules 43 are included, the light guide modules 43 may be grouped and adapted to be interposed between second light guide modules, along the ambient lighting system 3. FIG. 3 shows an embodiment in which three light guide modules 43 are grouped and adapted to be interposed between second light guide modules, along the ambient lighting system 3. The second light guide module is adapted to emit light rays homogeneously along the ambient lighting system 3. The second light guide module cooperates with a diffusive module 42 in order to emit light homogeneously along the ambient lighting system 3, reducing the number of light sources 41 and avoiding visibility of hot points along the ambient lighting system 3, in particular in correspondence to the light sources 41. The light guide modules 43 are adapted to define the region "B".

In another embodiment, for instance as shown in FIG. 2B, there are two light guide modules 43 interposed between second light guide modules, along the ambient lighting system 3. The two light guide modules 43 are adapted to define the boundaries of the region "B".

Possible embodiments of the light guide module 43 are disclosed in the Italian patent application IT201800010732A1, the whole content of which has to be considered as incorporated by reference in the content of the present patent application.

Hereafter an embodiment of the light guide module 43 is described. Each light guide module 43 comprises a planer inlet surface, from which the light rays emitted by the light source 41 enter; a parabolic reflecting surface adapted to collimate, in a controlled manner, the light rays emitted by the light source 41 and entering from the inlet surface. Advantageously, the light source 41 is positioned in the focus of the parabolic reflecting surface. Each light guide module 43 further comprises an extractor assembly comprising a plurality of extracting prisms. The extractor assembly is adapted to deflect the light rays reflected by the parabolic reflecting surface. Each light guide module 43 further comprises an emission surface, from which the light rays deflected by the extractor assembly come out. Each light guide module 43, according to aspects of this disclosure, is designed so that the light rays coming out of the emission surface are substantially perpendicular to the emission surface. In an embodiment of the light guide module 43, the parabolic reflecting surface comprises a plurality of pipe optics, which are distributed along the parabolic curve of the reflecting surface and are adapted to widen, in a controlled manner, the beam of light rays collimated by the parabolic reflecting surface. The parabolic reflecting surface and/or the extractor assembly may comprise metalized surfaces in order to increase the light ray reflection or deflection action. The plurality of extracting prisms may comprise an alternation of inclined surfaces, relative to the parabolic reflecting surface, and parallel surfaces, relative to the axis of the parabolic reflecting surface.

The shape, thickness, and length of the light guide modules 43 can change in function of the needs, and the light guide modules 43 can be properly designed.

Other possible embodiments of the light guide module 43, not described in detail in the present application, which are suitable to avoid that light rays guided by two different light guide modules can mix with each other, are contemplated to accord with and be considered within the scope of the present disclosure.

In embodiments, the light guide module 43 is an optical element that conducts light rays inside its structure, guiding the light rays, due to total reflection effect of the light rays. The light guide modules 43 may be made of transparent plastic materials or of transparent silicon materials, for instance PMMA. The plurality of light guide modules 43 may be manufactured as a single piece. Alternatively, they can be manufactured as a plurality of elements, which have to be assembled, and joined, in the ambient lighting system 3, according to the present disclosure.

In an embodiment, a plurality of capacitive touch sensors 6, placed along a direction inside the region "B", are included. The capacitive touch sensors 6 are electronically connected to the control unit 31. The control unit 31 is adapted to detect a sliding of the user's body portion on the contact surface 32 along a direction and determine a direction along which the user's body portion is sliding on the contact surface 32. The control unit 31 is also adapted to drive properly all the light sources 41 in order to emit light rays in the colors and/or intensities as desired by the user.

Alternatively, the control unit 31 is adapted to drive all the light sources 41 in function of a computer program or software comprising a sequence of steps, which allow driving the plurality of light sources 41.

The actuator system 7 is electronically connected to the control unit 31. The control unit 31 is also adapted to control the actuator system 7, in particular the control unit 31 is adapted to vary the frequency and/or intensity of the vibration produced by the actuator system 7 as a function of the sliding of the user's body portion on the contact surface 32, when the user is changing the color and/or intensity of the light rays emitted by the plurality of light sources 41 according to the user's desire or command other functionalities comprised in the automobiles.

In embodiments, capacitive touch sensors 6 are activated after a specific command of the users, such command being properly managed by the control unit 31, which activates the capacitive touch sensors 6.

In embodiments, the actuator system 7 and the capacitive touch sensors 6 are activated by the control unit 31. The actuator system 7 and the capacitive touch sensors 6 are activated when—and in embodiments only when—the same control unit 31 receives a command of activation of a specific function concerning the ambient lighting system 3.

In embodiments, the capacitive touch sensors 6 are activated only after that the same light sources 41 are properly driven in order to let the user see or recognize the region "B" on which the user can act. Thus, in embodiments, the capacitive touch sensors 6 are query (activated) only when the light sources 41 are properly driven for letting the user see region "B".

When the control unit 31 determines that the user is at least touching the contact surface 32, the same control unit 31 activates the actuator system 7 in order to give a haptic feedback to the user through the user's body portion that is touching the contact surface. At the same time, if the control unit 31 determines that a user's body portion is sliding on the contact surface 32, first, the control unit 31 determines/detects the direction along which the user's body portion is sliding, and then the control unit 31 commands the actuator system 7 in order to change intensity and/or frequency of the vibration, in function of the detected direction, thus increasing or decreasing the frequency and/or the intensity of the vibration. During this sliding, the user is experiencing a variation of vibration and—in some embodiments—sound, such variation of vibration can be of intensity and/or frequency.

More in general, when the control unit 31 determines that the user is no longer touching the contact surface 32, the actuator system 7 is deactivated, so that the contact surface vibrates no more, stopping vibrating and thus emitting any audible sound.

In an embodiment, in a normal using condition, the lighting system 3 could be switched off, thus not emitting light, or emitting light in a desired color and intensity, according to the user's behaviors and desires, or such ambient lighting system 3 can run a light animation, for example a welcome animation etc. In an advanced using condition, the ambient lighting system 3 could be brought in an interactive configuration. In the interactive configuration, the region "B", in some embodiments having sharp edges, is made visible. At the same time the capacitive touch sensors 6 may be activated, which allow the user to change color and intensity of the light rays emitted by the plurality of RGB LED light sources 41 as a function of the sliding of the user's body portion on the contact surface 32 detected by the control unit 31, or command other functionalities comprised in the automobiles, for instance automobile's heating system, air conditioning system etc. During these changes, thanks to the ambient lighting system 3, according to the present disclosure, the user is experiencing haptic feedback and/or acoustic feedback.

The ambient lighting system 3, according to the present disclosure, is particularly suitable for being applied in automobiles 2. An automobile 2 comprises a passenger compartment 22, wherein inner equipment is provided. The passenger compartment 22 comprises at least one area adapted to be lit by means of an ambient lighting system 3, according to the present disclosure.

The ambient lighting system 3, according to the present disclosure, may be placed at the corners, or along the border or edges, of a central console comprised in the passenger compartment 22. Alternatively (or in some combination), the ambient lighting system 3 may be placed on doors, which allow the users to enter in the passenger compartment 22, or around the rearview mirror, or around the car ceiling console, or even any other suitable place.

Figure 4:
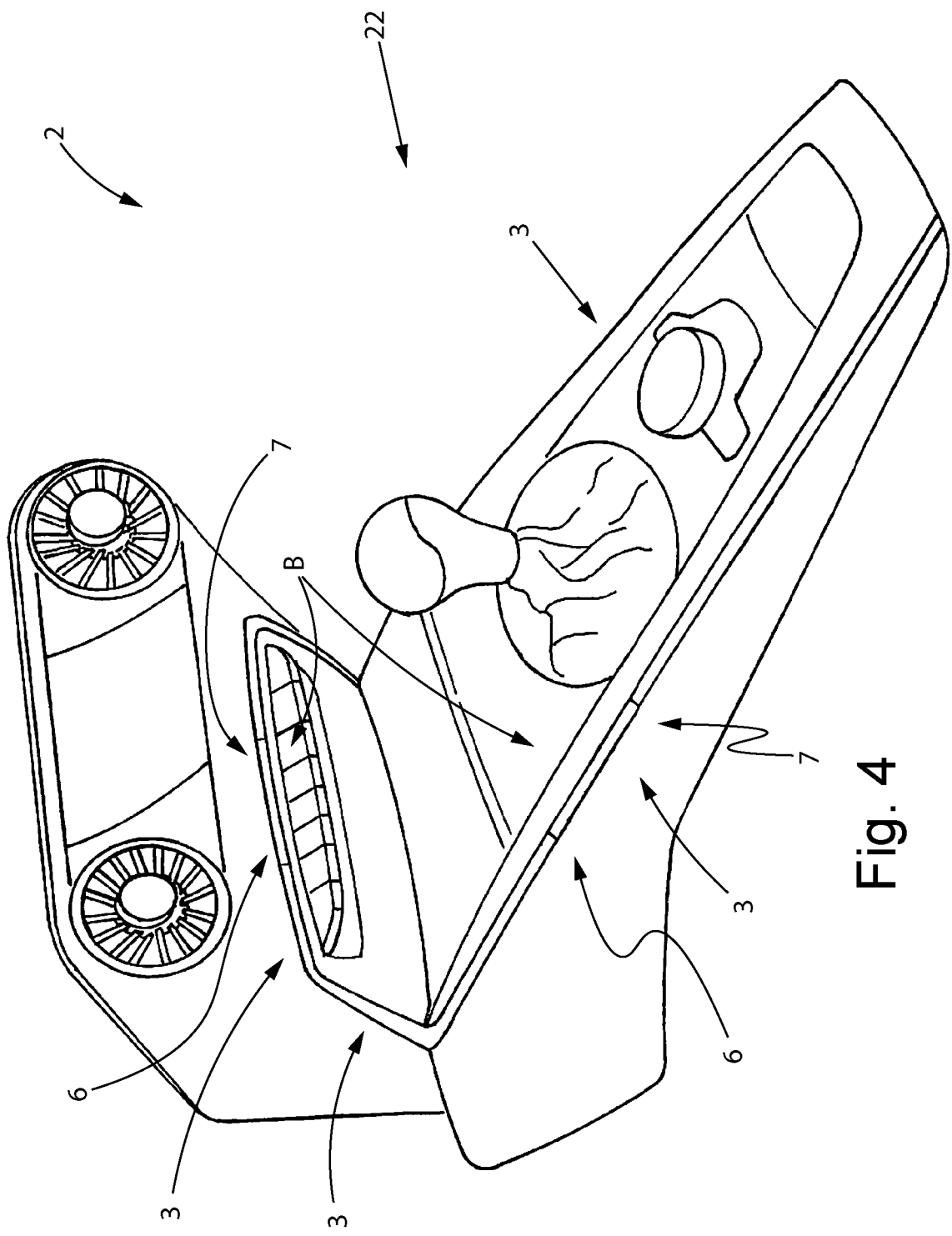
FIG. 4 shows a portion of an automobile, in particular a passenger compartment, in which an ambient lighting system, according to embodiments, is comprised.

FIG. 4 shows a portion of a passenger compartment 22 of an automobile 2, in which at least one area is adapted to be lit by means of an ambient lighting system 3, according to the present disclosure. In particular, FIG. 4 shows a central console of the passenger compartment 22, comprising the shift knob, a plurality of keys, which are specifically designed in order to activate a relative specific function or functionality.

At the console's border or edge is placed at least a portion of the ambient lighting system 3. A user, for instance the driver, can immediately see the region "B" that defines the area on which the user can slide a body portion, for instance a finger, in order to change color and or intensity of the light rays emitted by the plurality of light sources 41 as a function of the sliding of the user's body portion on the contact surface 32 detected or command other functionalities comprised in the automobile. When the user is touching the contact surface 32 the actuator system 7 is activated in order to produce a vibration perceptible by the user's body portion, giving a haptic feedback that changes in function of the way along the direction on which the user's body portion is sliding.

FIG. 1A shows a portion of the ambient lighting system 3, according to the present disclosure, able to generate a haptic feedback to the user, in particular the ambient lighting system 3 is able to produce, thanks to an actuator system 7, vibrations perceptible by the user's body portion when the user's body portion is sliding on the contact surface 32, in a region "B", for instance in order to vary the color of the light rays emitted by the light sources 41. The user varies the color of the light rays emitted by the light sources of the ambient lighting system 3 from a colder shade of color to a warmer shade of color sliding the finger on the contact surface 32 along a direction from the left to the right. During this sliding, the user experiences an incremental variation of vibration, for instance an increasing of intensity or frequency.

FIG. 1B shows a portion of the ambient lighting system 3 according to the present disclosure, able to generate a haptic feedback to the user, in particular the ambient lighting system 3 is able to produce, thanks to an actuator system 7, vibrations perceptible by the user's body portion when the user's body portion is sliding on a contact surface 32, in a region "B", for instance in order to vary the intensity of the light rays emitted by the light sources. The user varies the intensity of the light rays emitted by the light sources of the ambient lighting system 3 from a lower intensity to an higher intensity sliding the finger on the contact surface 32 along a direction from the left to the right. During this sliding, the user experiences an incremental variation of vibration, for instance an increasing of intensity or frequency.

In a further embodiment, the ambient lighting system 3, according to the present disclosure, can be used for controlling temperature inside the compartment 22 of the automobile 2. In this embodiment, when the user says "climate", the control unit 31 controls the plurality of light sources 41 of the optical system 4, in order to show to the user the defined region "B". In such an embodiment, the defined region "B" defines and displays two soft buttons, at the borders, and a slider area among such soft buttons. The control unit 31 may control at least one light source 41 so that the user may see one of the two soft buttons as blue and the other as red. Then, the control unit 31 may control the plurality of capacitive touch sensors 6 in order to detect touches of the contact surface 32 by a user's body portion in the defined region "B". In embodiments, touching on the blue soft key causes the temperature inside the compartment 22 to decrease, whereas, touching on the red soft key causes the temperature inside the compartment to increase. If the control unit 31 detects, through the capacitive touch sensors 6, a sliding of the user's body portion on the contact surface 32 along at least one direction, the temperature inside the compartment 22 will change as a function of the direction along which the user's body portion is sliding on the contact surface 32. During the touches on the soft keys and the sliding along the contact surface 32, haptic and/or acoustic feedback is applied and sensed by the user. Such haptic feedback may be used in order to confirm correct activation of the functionalities.

With reference to FIG. 2A, there is shown a cross section of a possible embodiment of the ambient lighting system 3, according to the present disclosure, in a schematic view.

The ambient lighting system 3 comprises an actuator system 7 adapted to produce at least a vibration perceptible by the user's body portion when the user's body portion is touching the contact surface 32 in a defined region "B".

In FIG. 2A, the actuator system 7, driven by the control unit 31, comprises an actuator 72. The actuator 72 is an electromagnetic actuator adapted to move a reference plate. The actuator 72 is placed below the structural support 40, for example a PCB, on which the light source 41 is placed. The contact surface 32 is mechanically connected to the actuator 72 through suitable connecting elements passing through the structural support 40, in particular connecting columns. In this embodiment the structural support 40 is not subjected to the vibrations generated by the actuator system 7.

On the structural support 40 are capacitive sensors, in particular a conductive layer 63 is connected on the other face of the structural support 40, face opposite to the face where the light source 41 are placed.

Above the light source 41 a light guide module 43 is placed. The light guide module 43 is placed under the contact surface 32 and a gap, in particular an air gap, is present. In this embodiment, when the contact surface 32 vibrates, it does not touch the light guide module 43. The light guide module 43 is properly fixed on the structural support 40 (not shown) in order to maintain the same light guide module 43 in focus above the light source 41. In this embodiment, since no vibration movement is transmitted to the structural support 40, the light sources 41 and the light guide module 43 are always optically coupled in the best way possible.

The actuator system 7 comprises means for properly regulating the mechanical vibration delivered by the actuator 72 to the contact surface 32 thanks to the connecting elements. The capacitive sensor 6 and the light source 41 are electrically connected to the control unit 31.

FIG. 2B shows a longitudinal section of the ambient lighting system 3 of FIG. 2A. From this figure it is clear that the ambient lighting system 3 comprises an actuator system 7 comprising two electromagnetic actuators 72.

The two actuators 72 are electrically connected to the control unit 31, which is able to properly control them, for example synchronously, in order to produce at least a vibration perceptible by the user's body portion when the user's body portion is touching the contact surface 32 in the defined region "B". The couple of actuators 72 is placed below the structural support 40. The actuators 72 are mechanically connected to the contact surface 32 due to the connecting elements, which are able to transmit vibration from the actuators 72 to the contact surface 32.

FIG. 2B shows the user's body portion, in particular a finger, and its possible movements, in order to touch the contact surface 32, tapping on it, or sliding along the contact surface 32, such as along a direction in both ways, and within region "B". Below the contact surface 32 a plurality of light guide modules are placed along the longitudinal extension of the ambient lighting system 3. In an embodiment, the ambient lighting system 3 comprises two light guide modules 43 which define the boundaries of the region "B", and among the two light guide module 43 other light guide module, for instance second light guide modules, are placed. Each light guide module is properly optically coupled with a light source 41. The light sources 41 are placed on a face of the structural support 40, for example a PCB. On the opposite face of the structural support 40 conductive layers 63 are placed. The conductive layers 63 are part of capacitive touch sensors 6.

Over the region "B" two mechanical constraints, not shown, are placed. The two actuator 72 of the actuator system 7 are placed among the mechanical constraints, inside the region "B".

The control unit 31 drives both the light sources 41 and the actuators 72 in the actuator system 7, and the capacitive touch sensor 6.

FIG. 3 shows an embodiment of an ambient lighting system 3, according to the present disclosure, comprising an optical system 4 in which light guide modules 43 are included and grouped. FIG. 3 shows another possible embodiment, in which a plurality of capacitive touch sensors 6 and a plurality of light guide modules 43, are properly placed in an optical system 4 in order to define the region "B". The light guide modules 43 are grouped and placed between second light guide modules, in particular a second light guide module at both sides. A corresponding light source 41 is associated with each guide module. All of the light sources 41 are placed on a single structural support 40, for example a PCB. In the embodiment shown in FIG. 3, a single diffusive module 42 is placed above the guide modules. Above the light guide modules, a transparent conductive layer 63 is placed, and may lay upon the diffusive module 42. The contact 32 is laid upon the optical system 4. The actuator system 7 acts on the contact surface 32, the former being controlled by the control unit 31.

Embodiments of the ambient lighting system 3 allow transforming some regions "B" in human-machine interfaces to be able to provide a haptic feedback to the user with optimization of costs.

The ambient lighting system 3, according to the present disclosure, allows creating a new human-machine interface (HMI) in an innovative way. The ambient lighting system 3, according to the present disclosure, allows turning areas of the same ambient lighting system 3 in an input device, which gives to the users haptic feedback as a function of how the user is touching the ambient lighting surface 3, and in particular the contact surface 32, for instance in order to confirm correct activation of functionalities.

The user can vary the color of the light rays emitted by the light sources 41 of the ambient lighting system 3 from a colder shade of color to a warmer shade of color sliding the finger on the contact surface 32 along a direction in a specific way. During this sliding, the user may experience an incremental variation of vibration and sound, such variation of vibration can be of intensity and/or frequency. For the sake of completeness, for instance sliding the finger on the contact surface 32 in the opposite way along the same direction the light rays emitted vary from a warmer shade con color to a colder shade of color. During this sliding, the user may experience a decrease in the variation of vibration and sound.

The user may feel the same experience when the same user wants to change the intensity of the light rays emitted by the light sources 41 of the ambient lighting system 3, or control other functionalities comprised in the automobile, as explained before.

The ambient lighting system 3, according to the present disclosure, is able to make continuous light animation and/or to be illuminated, in specific region "B", with very sharp contrast to the rest of the ambient lighting system 3. The user may know intuitively which region or portion of the same ambient lighting system 3 has to touch in order to give input; therefore, the ambient lighting system 3 is turned into a functional part and can be interacted with effectively by users.

Although embodiments have been described with reference to the drawings, those of skill in the art will appreciate that variations and modifications may be made without departing from the spirit, scope and purpose of the invention as defined by the appended claims.

NUMERICAL REFERENCES

Automobile 2
Passenger compartment 22
Ambient lighting system 3
Control unit 31
Contact surface 32
Optical system 4
Structural support 40
Light source 41
Diffusive module 42
Light guide module 43
Capacitive touch sensor 6
Conductive layer 63
Actuator system 7
Actuator 72
Region "B"

What is claimed is:

1. An ambient lighting system for automobiles adapted to illuminate at least a portion of a passenger compartment;
    said ambient lighting system, being adapted to emit light in colors and intensities as desired or run a light animation, and having a longitudinal extension that is greater, at least of an order of magnitude, than a width and a thickness of said ambient lighting system, and wherein the width and the thickness have comparable dimensions;
    said ambient lighting system comprising:
        at least one optical system comprising:
            a plurality of light sources adapted to emit light rays;

a structural support on which said plurality of light sources are placed;

at least one contact surface on which a user can act, and through which light rays emitted by said plurality of light sources can exit; and a plurality of light guide modules, interposed between the light sources and said contact surface, adapted to guide the light rays emitted by said light sources and being designed to isolate the light rays emitted by each light guide module in order to realize regions adapted to be illuminated and to present sharp contrast with other portions of the ambient lighting system;

said ambient lighting system further comprising:

a control unit adapted to control said plurality of light sources of said optical system; and at least one capacitive touch sensor, locally integrated in the ambient lighting system, electronically connected to said control unit, and adapted to detect touch of said contact surface by a user's body portion in at least one defined region; and an actuator system, configured to generate a haptic feedback at least when the user is touching said contact surface in said at least one defined region;

wherein said actuator system is adapted to produce a vibration perceptible by the user's body portion when said user's body portion is touching said contact surface in said at least one defined region; and wherein said actuator system is electronically connected to said control unit, which is adapted to control said actuator system.

2. The ambient lighting system according to claim 1, wherein said at least one capacitive touch sensor includes a plurality of capacitive touch sensors located inside said region;

wherein said plurality of capacitive touch sensors are electronically connected to said control unit; and wherein said control unit is adapted to detect a sliding of said user's body portion on said contact surface along at least one direction.

3. The ambient lighting system according to claim 2, wherein said control unit is adapted to detect a way, along said direction, along which said user's body portion is sliding on said contact surface.

4. The ambient lighting system according to claim 2, wherein said control unit is adapted to vary a color and/or an intensity of light rays emitted by said plurality of light sources as a function of the sliding of said user's body portion on said contact surface detected.

5. The ambient lighting system according to claim 2, wherein said control unit is adapted to vary an intensity and/or a frequency of the vibration produced by said actuator system as a function of the sliding of said user's body portion on said contact surface detected.

6. The ambient lighting system according to claim 2, wherein said control unit is adapted to vary an intensity and/or a frequency of the vibration produced by said actuator system as a function of a variation of the color and/or the intensity of the light rays emitted by said plurality of light sources simultaneously with the sliding of said user's body portion on said contact surface.

7. The ambient lighting system according to claim 1, wherein said contact surface is mechanically constrained at least at two points along its longitudinal extension;

wherein said actuator system comprises at least one actuator;

wherein said at least one actuator is placed between two mechanical constraints, inside said defined region; and wherein said at least one actuator is adapted to produce a vibration perceptible by the user's body portion.

8. The ambient lighting system according to claim 1, wherein said contact surface, due to its vibration, generates at least a sound audible at least by the user who is touching said contact surface.

9. The ambient lighting system according to claim 1, wherein said capacitive touch sensor is placed below said contact surface and upon a face of said structural support.

10. The ambient lighting system according to claim 1, wherein said control unit is configured to activate each of said actuator system and said capacitive touch sensors in response to receiving a command of activation of a specific function concerning said ambient lighting system.

11. The ambient lighting system according to claim 1, wherein the light sources are RGB LEDs.

12. An automobile comprising a passenger compartment including inner equipment; and wherein said passenger compartment includes at least one area adapted to be lit by the ambient lighting system according to claim 1.

13. The ambient lighting system according to claim 1, wherein the comparable dimensions of the width and the thickness of said ambient lighting system include the width being no more than two times the thickness and the width being no less than one-half of the thickness.

* * * * *